US006110583A

United States Patent [19]
Varanasi et al.

[11] Patent Number: 6,110,583
[45] Date of Patent: Aug. 29, 2000

[54] GLASS ARTICLE MADE FROM COMPOSITIONS CONTAINING SPECTRAL MODIFIERS

[75] Inventors: Srikanth Varanasi, Toledo; Michael B. Purvis, Perrysburg; Paige L. Higby, Maumee; Kevin V. Goodwin; Gwendolyn A. Young, both of Toledo, all of Ohio

[73] Assignee: Libbey-Owens-Ford Co., Toledo, Ohio

[21] Appl. No.: 09/359,445

[22] Filed: Jul. 22, 1999

Related U.S. Application Data

[62] Division of application No. 08/989,073, Dec. 11, 1997, Pat. No. 6,001,753
[60] Provisional application No. 60/033,644, Dec. 20, 1996.
[51] Int. Cl.[7] .............................. B32B 9/00; C03C 6/00
[52] U.S. Cl. .................. 428/332; 428/428; 428/437; 296/84.1; 501/24; 501/27; 501/30; 501/31; 501/71
[58] Field of Search ............................ 428/332, 428, 428/437; 296/84.1; 501/24, 27, 30, 31, 71

[56] References Cited

U.S. PATENT DOCUMENTS

| | | |
|---|---|---|
| 1,961,603 | 6/1934 | Berger . |
| 3,944,352 | 3/1976 | Morgan . |
| 4,713,359 | 12/1987 | Lubelski et al. . |
| 4,731,293 | 3/1988 | Ekholm et al. .................. 428/426 |
| 4,792,536 | 12/1988 | Pecoraro et al. . |
| 5,077,133 | 12/1991 | Cheng . |
| 5,508,236 | 4/1996 | Chiang et al. . |
| 5,733,660 | 3/1998 | Makita et al. .................. 428/426 |
| 5,928,793 | 7/1999 | Kimura ........................... 428/428 |
| 5,972,513 | 10/1999 | Yoshizawa ...................... 428/410 |
| 6,001,753 | 12/1999 | Varanasi et al. ................. 501/27 |

*Primary Examiner*—Timothy M. Speer
*Assistant Examiner*—Bryant Young
*Attorney, Agent, or Firm*—Marshall & Melhorn

[57] ABSTRACT

Silicate based glass compositions with phosphorus compounds included in the composition as spectral modifiers to impart desirable color and improved energy absorbance properties are disclosed. The phosphorus compound is generally a metal phosphide which is added to the batch glass composition in amounts greater than 0.05 weight percent prior to melting. The composition and method result in a finished glass suitable for use in architectural and automotive glazings.

20 Claims, 2 Drawing Sheets

GLASS ARTICLE MADE FROM COMPOSITIONS CONTAINING SPECTRAL MODIFIERS

RELATED APPLICATIONS

This application is claiming the benefit, under 35 U.S.C. § 120, of the application filed Dec. 11, 1997 under 35 U.S.C. § 111, which was granted a Ser. No. 08/989,073 now U.S. Pat. No. 6,001,753. The application Ser. No. 08/989,073 claimed the benefit, under 35 U.S.C. § 119(e), of the provisional application filed Dec. 20, 1996, under 35 U.S.C. 111(b), which was granted a Ser. No. 60/033,644. This application is a divisional application of the application granted the Ser. No. 08/989,073. The utility application, Ser. No. 08/889,298, and the provisional application, Ser. No. 60/033,644 are hereby incorporated by reference.

BACKGROUND OF THE INVENTION

1. Field of the Invention

The present invention is directed to silicate based glass compositions with phosphorus compounds included in the composition as spectral modifiers and the methods of making the composition and glass articles formed therefrom. More particularly, the present invention is directed toward the use of metal phosphides in silicate based glasses for the improvement of spectral properties such as the absorption of infrared energy and the transmittance of color. Certain metal phosphides, specifically iron and zinc phosphides, significantly improve the absorption of near infrared radiation in silicate based glass compositions.

2. Summary of Related Art

Spectral modifiers are often added to base glass compositions to impart specific color and energy absorbance properties in the finished glass. The absorption of energy at specific wavelengths is often desirable to enable various uses for the glass compositions. Additionally, certain colors are preferred for various glasses for aesthetic reasons. There are limitations within specific glasses that must be balanced or optimized when attempting to achieve desired color and energy transmittance properties. For example, certain ingredients may improve the absorption of near infrared energy while imparting an undesirable color or reducing the light transmittance. Thus, the optimization of a specific color or energy transmittance property often negatively impacts other desirable transmittance properties.

The use of phosphorus, measured as $P_2O_5$, as a network former is known in the art for producing phosphate glass compositions. A network former is the primary cation in the glass composition that bonds with oxygen to create the amorphous network. Thus, phosphate glass compositions are generally glasses having over a 25 mole% $P_2O_5$ content. Other cations, such as silicon, may be included in a phosphate glass composition. However, a phosphorus content in excess of the noted limit is generally classified as a phosphate glass. Phosphorus is typically introduced to the glass batch composition in the form of phosphate salts. It is generally understood in the art that the viscosity of molten phosphate based glass compositions is not suitable for application in a float bath process. Additionally, phosphorus, at elevated levels, can adversely affect the brickwork in the float glass process.

Phosphorus based glasses often have desirable infrared or heat absorbing capabilities. U.S. Pat. No. 3,944,352 discloses a heat absorbing glass composition having acceptable visible light transmittance and heat absorbing capabilities. The glass composition contains 50–65% $P_2O_5$, with 1–9% of the $P_2O_5$ added in the batch as ammonium phosphate. The glass exhibits a visible light transmittance in excess of 65% and an infrared transmittance of below 30%. Although the optical properties of the glass are desirable, the physical properties and manufacturing requirements of a phosphate glass prevent them from being manufactured in a float glass production process.

Phosphates have also been included in silicate based glasses, wherein silicon is the primary network forming cation. For example, U.S. Pat. No. 4,713,359 discloses the use of phosphates, measured as $P_2O_5$, in a silicate based glass composition. The composition uses up to 1% by weight of $P_2O_5$. The resulting glass has a visible light transmittance (Ill A) of greater than 70% and total solar heat transmittance of less than 50%. In general, phosphates in silicate glasses are added in the salt form ($PO_4^{-3}$) in amounts less than about 3 wt %. Phosphate contents of greater than 4 wt % generally result in phase separation in the glass.

Infrared absorbing, or heat reducing, silicate glasses are also known within the art. In general, infrared absorbing silicate glasses involve the addition of specific colorants that impact the color and energy transmittance properties of the glass. It is generally known to manufacture heat or infrared radiation absorbing silicate glass by the incorporation therein of iron. The iron is generally present in the glass as both ferrous oxide (FeO) and ferric oxide ($Fe_2O_3$). The balance between ferrous and ferric oxide has a direct and material effect on the color and transmittance properties of the glass. As the ferrous oxide content is increased (as a result of chemically reducing ferric oxide), the infrared absorption increases and the ultraviolet absorption decreases. The shift toward a higher concentration of FeO in relation to the $Fe_2O_3$ also causes a change in the color of the glass from a yellow-green to a blue-green, which reduces the visible transmittance of the glass. Therefore, in order to obtain greater infrared absorption in glass without sacrificing visual transmittance, it has been deemed necessary in the prior art to produce glass with a low total iron content which is highly reduced from $Fe_2O_3$ to FeO.

U.S. Pat. No. 4,792,536 discloses a process for producing an infrared energy absorbing glass, containing a low total iron concentration which is highly reduced to FeO. It is further disclosed that the infrared energy absorption can be increased by including greater amounts of total iron in the glass composition, but states that the visible light transmittance would thereby be reduced below levels considered adequate for automotive glazings. The disclosed process utilizes a two stage melting and refining operation, which provides highly reducing conditions so as to increase the amount of iron in the ferrous state for a given low total iron concentration of from 0.45% to 0.65% by weight. The patent teaches that the iron must be at least 35% reduced to FeO. Another example of an infrared absorbing silicate glass is found in U.S. Pat. No. 5,077,133. The patent discloses a green colored infrared and ultraviolet absorbing silicate glass which includes an amount of ceric oxide, or alternatively ceric oxide and titanium dioxide, and a high concentration of moderately reduced iron. The glass composition exhibits a visible light transmittance of at least 70% and a total solar energy transmittance of less than 46%. Although the glass composition exhibits a low solar energy transmittance, it is desirable to further reduce the total solar energy transmittance, through the absorption of near infrared energy, while maintaining the high visible light transmittance.

It would be an advantage to provide a spectral modifier for use in a silicate glass composition that has the desired color and significantly improves energy absorbance properties without adversely impacting other transmittance properties.

It would also be an advantage to utilize a phosphorus compound in a silicate based glass composition at a level sufficient enough to impact the spectral properties without causing phase separation in the finished glass composition.

It would be a further advantage to increase the absorption of infrared energy without adversely affecting the visible light transmittance of the finished glass composition.

It would also be an advantage to utilize a spectral modifier to improve color and energy properties in a silicate based glass composition wherein the inclusion of the spectral modifier does not adversely impact the manufacturing of the glass in a float glass production process.

SUMMARY OF THE INVENTION

According to the present invention, there is provided a phosphorus compound suitable for use in a silicate batch glass composition as a spectral modifier to impart desirable color and improve energy absorbance properties over conventional silicate glasses. The phosphorus compound is generally a metal phosphide which is added to the batch glass composition prior to melting. The present invention also includes a process for melting the glass batch composition and the articles produced therefrom.

The present invention utilizes metal phosphides in silicate based glass compositions to improve color and energy absorbance properties of the finished glass. The use of a metal phosphide results in the unexpected improvement of color or energy absorbance properties when added to conventional silicate based glass compositions.

The glasses produced in accordance with the present invention may have various different colors and optical properties. The metal phosphide is utilized to produce glasses with a visible light transmittance of 10% or greater, depending upon additional colorants utilized in the glass batch composition. Additionally, specific applications may require the use of the metal phosphide in glasses needing a visible light transmittance in excess of 70% with a high degree of absorption of near infrared energy.

The preferred metal phosphides suitable for use in the present invention are selected from the group consisting of iron phosphide, zinc phosphide, titanium phosphide, manganese phosphide, tin phosphide, copper phosphide, nickel phosphide, tantalum phosphide, chromium phosphide, niobium phosphide, lithium phosphide, sodium phosphide, magnesium phosphide, cadmium phosphide, molybdenum phosphide, tungsten phosphide, vanadium phosphide, zirconium phosphide, cobalt phosphide, hafnium phosphide, barium phosphide, boron phosphide, aluminum phosphide, gallium phosphide, indium phosphide, iridium phosphide, scandium phosphide, yttrium phosphide, lanthanum phosphide, cerium phosphide, praseodymium phosphide, terbium phosphide, erbium phosphide, dysprosium phosphide, holmium phosphide, neodymium phosphide, samarium phosphide, germanium phosphide, calcium phosphide, silver phosphide, platinum phosphide, and gadolinium phosphide. However, other metal phosphides may be suitable for use in a glass batch composition.

Each of the phosphides may impart different characteristics to the finished silicate glass. Therefore, the selection of the metal phosphide is dependent upon the desired color and energy absorbance properties of the finished glass as well as the base glass composition and other colorants included in the base glass composition. Additionally, several of the noted spectral modifiers may be utilized in combination in the glass batch composition.

In accordance with the present invention, the most preferred phosphides include iron phosphide, zinc phosphide, titanium phosphide, and molybdenum phosphide. A finished silicate glass containing iron, and produced with the preferred phosphide compounds, can exhibit improved absorption of near infrared energy over glasses without the noted metal phosphides.

It is an object of the present invention to provide a spectral modifier for use in silicate batch glass compositions that significantly improves the color and energy absorbance properties of the finished glass composition. The metal phosphide of the present invention is a suitable spectral modifier that is capable if improving the energy absorbance of the glass over conventional silicate glasses.

It is also an object of the present invention to utilize a metal phosphide in a glass composition to improve specific color or energy absorbance properties without adversely affecting other properties, such as the visible light transmittance.

Additionally, it is an object of the present invention to utilize a metal phosphide as a spectral modifier in a silicate glass composition that will not cause phase separation. The metal phosphides of the present invention are suitable for use in batch compositions in a float glass production process.

DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENT

Figure 1:
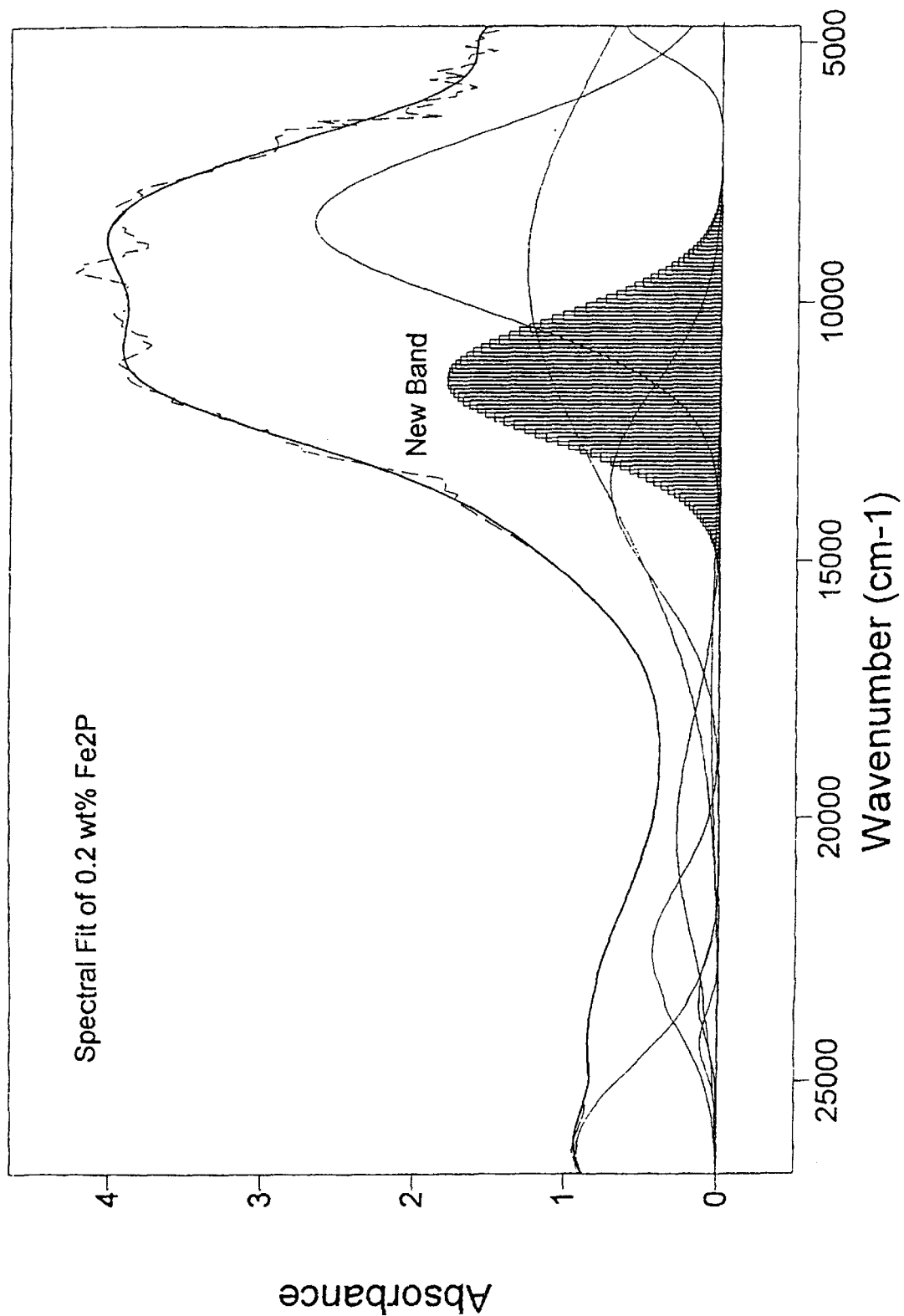
FIG. 1 is a graph of a silicate glass composition highlighting a new absorbance band at a wavenumber of between 10,000 and 15,000 cm$^{-1}$.

In accordance with the present invention, it has surprisingly been discovered that a phosphorus compound may be included in a silicate based batch glass composition as a spectral modifier to improve color or energy absorbance properties of the finished glass. The phosphorus compound is generally a metal phosphide added to conventional silicate glass compositions. It is desirable to improve solar attenuation properties in glass to improve the efficiency and expand the use of the resulting glass articles. In addition to the solar attenuation properties, specific colors are often desired in finished glass compositions. The metal phosphides of the present invention can significantly impact one or both of the color and solar attenuation properties of the finished silicate glass.

The present invention is suitable for use in silicate glasses. Silicate glasses are generally glasses which utilize silicon as the network former. The network former is the primary cation which bonds with oxygen to create the amorphous network. In general, silicate glasses are glasses having over 25 mole% silica ($SiO_2$) in the composition. Thus, silicate glasses can include other cations in the glass composition, such as aluminum, sodium, calcium, magnesium, phosphorus, and boron. Silicate glasses are preferred because their physical properties enable the production of the glass in a float glass production process.

A preferred silicate glass is a soda-lime-silica composition. The composition of soda-lime-silica glasses suitable for use in accordance with the present invention typically have the following weight percentage constituents:

| | |
|---|---|
| $SiO_2$ | 65–80% |
| $Na_2O$ | 10–20 |
| CaO | 5–15 |
| MgO | 0–10 |
| $Al_2O_3$ | 0–5 |
| $K_2O$ | 0–5 |
| BaO | 0–5 |
| $B_2O_3$ | 0–5 |
| $Ga_2O_3$ | 0–5 |

Other minor ingredients, including melting and refining aids such as sulfur compounds (measured as $SO_3$), may also appear in the glass composition at levels less than one weight percent without affecting the properties of the finished glass composition. Suitable raw material for producing a soda-lime-silica glass include, sand, limestone, dolomite, soda ash, salt cake or gypsum, niter, iron oxide, and carbon.

The silicate based glass compositions to which the metal phosphides of the present invention are added may include conventional colorants. In addition to coloring the glass, the colorants may also impart certain energy attenuation properties such as the absorption of infrared and ultraviolet radiation. The metal phosphides of the present invention, when included with known colorants, can affect the color and energy absorbance properties beyond anticipated effects generally recognized with the colorants alone.

In a preferred embodiment, the metal phosphide of the present invention is admixed, heated, and melted in the glass batch composition along with an amount of iron. The colorant iron is known to impart specific color and energy absorbance properties to the finished glass. The combination of iron and a metal phosphide can improve the energy absorbance properties in the finished glass over those generally obtained with iron alone.

One or more of the metal phosphides are added to the silicate batch glass composition with the other batch ingredients. The metal phosphides are generally added to the batch composition in amounts ranging from about 0.05 weight percent to about 4.0 weight percent. However, the upper limitation may be extended for specific metal phosphides up to a point prior to phase separation of the glass.

All metal phosphides may be suitable for use in glass batch compositions. The preferred metal phosphides are selected from the group consisting of iron phosphide, zinc phosphide, titanium phosphide, manganese phosphide, tin phosphide, copper phosphide, nickel phosphide, tantalum phosphide, chromium phosphide, niobium phosphide, lithium phosphide, sodium phosphide, magnesium phosphide, cadmium phosphide, molybdenum phosphide, tungsten phosphide, vanadium phosphide, zirconium phosphide, cobalt phosphide, hafnium phosphide, barium phosphide, boron phosphide, aluminum phosphide, gallium phosphide, indium phosphide, iridium phosphide, scandium phosphide, yttrium phosphide, lanthanum phosphide, cerium phosphide, praseodymium phosphide, terbium phosphide, erbium phosphide, dysprosium phosphide, holmium phosphide, neodymium phosphide, samarium phosphide, germanium phosphide, calcium phosphide, silver phosphide, platinum phosphide, and gadolinium phosphide. Depending upon the specific metal, the metal phosphide may be present in various stoichiometric formulas. The phosphides are added to the silicate batch glass composition prior to melting.

Different metal phosphides affect the finished glass composition in different ways. For example, the most preferred iron, zinc, titanium, and molybdenum phosphides, when included with a conventional glass containing an amount of iron, are capable of impacting the absorbance of near infrared energy of the glass. The iron in the glass batch composition may originate from the phosphide or from other conventional sources. The iron is generally included in an amount in the batch glass composition so as to result in about 0.1 weight percent to about 4.5 weight percent total iron in the finished glass.

Iron phosphide and zinc phosphide are both capable of producing a glass that has an Illuminant A visible light transmittance of greater than 70% and a direct solar heat transmittance of less than 43%, and preferably less than 41%, at a nominal 3–6 mm thickness. This is a significant improvement over conventional heat absorbing glasses which have a visible light transmittance of greater than 70% and direct solar heat transmittance value of just less than 46%. Additionally, the batch composition may be adjusted to achieve a visible light transmittance of 75% and a direct solar heat transmittance of less than 47% for specific applications.

Figure 2:
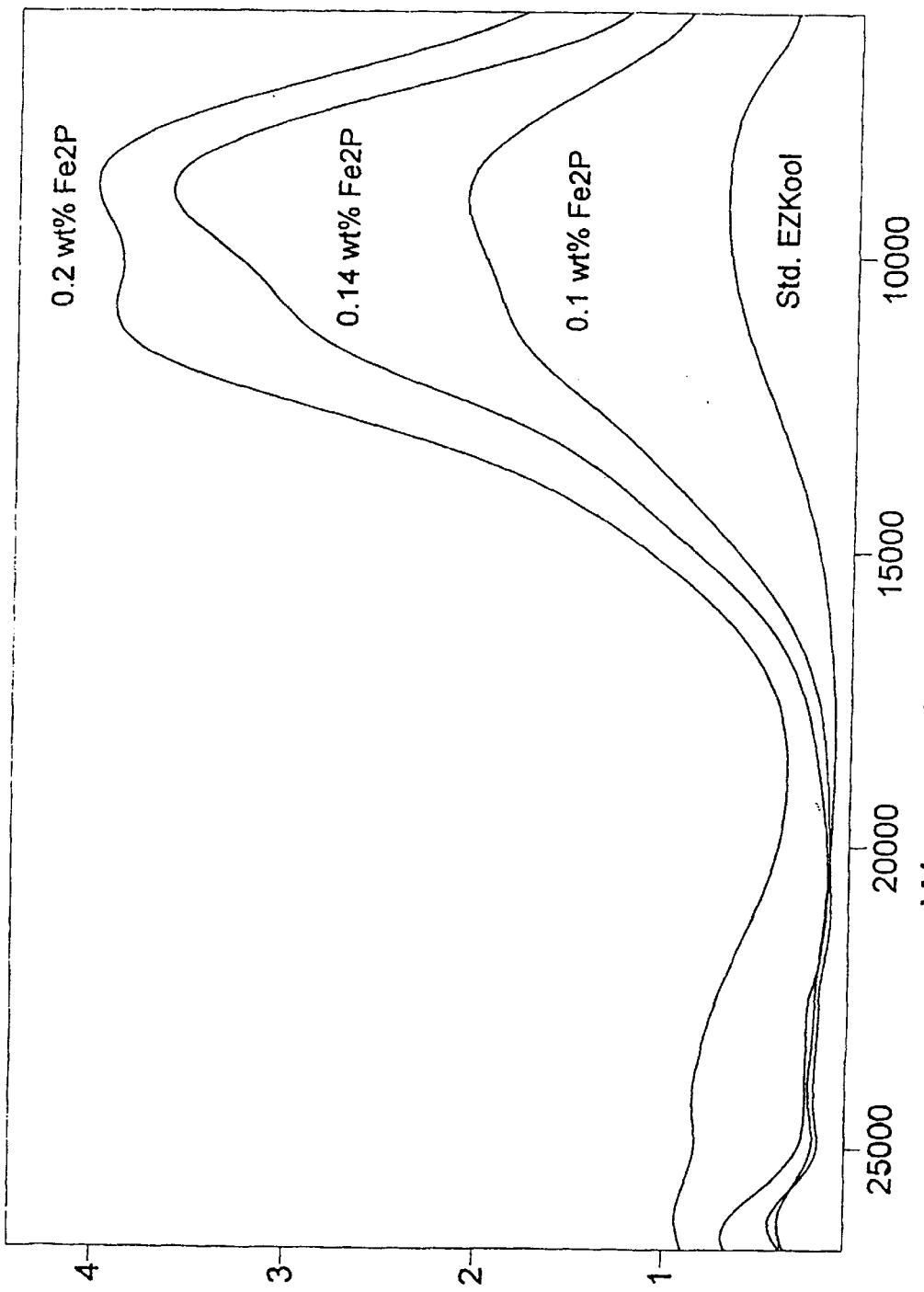
FIG. 2 is a graph of absorbance v. wavenumber for several silicate glass compositions having different levels of iron phosphide.

FIGS. 1 and 2 are utilized to illustrate the differences of the present invention from conventional silicate glasses. The inventors propose that the phosphorus, introduced as a metal phosphide, remains in the structure of the finished glass in a manner or form which changes the structural environment of the energy absorbing component, or components, in the glass. This change or perturbation is increasingly recognized in silicate glasses containing an amount of iron where the results indicate an improved absorption of near infrared energy. However, the inventors do not wish to limit the invention to just this possible explanation, and therefore, offer it merely as an aid to understanding the results of the present invention.

The increased absorption of near infrared energy in a silicate glass with an iron phosphide is illustrated in FIG. 1. FIG. 1 is a graph of a silicate glass composition having 0.2% by weight of iron phosphide. The solid, thick line in FIG. 1 is a statistical fit of the measured data recorded for the glass composition. The thin lines represent standard or known absorbing transitions anticipated with the glass composition. The figure illustrates a proposed new absorbance band between the 10,000 and 15,000 $cm^{-1}$. The inventors have statistically fit the new band onto the graph to account for the absorbance recorded with the actual data between the noted 10,000 to 15,000 $cm^{-1}$ range. This band does not appear in the silicate glass when the iron phosphide is excluded. Thus, the inventors propose, as an aid to understanding the results of the present invention, that the increased attenuation of infrared energy is attributed to the new absorbance band which appears at the indicated wave number range.

FIG. 2 further illustrates the impact of iron phosphide on a standard heat absorbing silicate glass. FIG. 2 is a graph of absorbance versus wave number for several silicate glasses having various concentrations of iron phosphide. For comparison, a standard silicate glass without the spectral modifier is also included in the graph. The graph illustrates the increase in absorbance in the near infrared range with increasing quantities of iron phosphide.

Some of the metal phosphides, other than zinc and iron, also impact the desired color and energy absorbance properties of finished glass compositions. For example, manganese ($MnO_2$) is generally a colorant added to silicate glass compositions to turn the color of the glass purple. The inclusion of the manganese phosphide in the silicate glass composition did not turn the glass purple as conventionally expected, but rather resulted in a clear glass.

The metal phosphides included in the silicate glass batch composition are admixed, heated, and melted to form the finished glass. Conventional glass batch mixing devices are utilized in compounding the ingredients. The batch materials are melted together in a conventional glass making furnace, to form a silicate glass composition, which thereafter may be continuously cast onto the molten metal bath in a float glass production process.

The resulting finished glass may have various colors and energy transmittance properties depending upon the other components and colorants utilized in the glass batch composition. The finished glass will generally have a visible light transmittance (ILLA) of greater than 10%. Select light transmittance ranges may be obtained by varying specific colorants. For example, the metal phosphides may be utilized to produce automotive glazings. The present invention could be combined with iron in a soda-lime-silica glass to produce a glazing unit wherein two sheets of glass, at a thickness in the range of about 1.7 mm to about 2.5 mm, are adhered together through a layer of interposed resinous material to form an automotive windshield. The present invention is also suitable for producing other automotive and architectural glazings.

The following examples in Table I illustrate glass compositions in accordance with the invention that are readily formed into glass articles or glazings. Each example includes a soda-lime-silica base glass composition prepared in accordance with the present invention. The specific spectral modifier and colorant compositions are noted for each example.

The examples were prepared by weighing the noted ingredients, colorants, and spectral modifiers on a Mettler balance. The colorants and spectral modifiers were added to a conventional base glass batch composition including sand, dolomite, limestone, soda ash, saltcake, and gypsum. The ingredients were placed in a high temperature crucible and thoroughly mixed to provide a homogeneous mixture. The crucibles were then placed in a gas-fired furnace. The temperature of the furnace was slowly ramped to 2600° F. and held at that temperature for over four hours. During the high temperature holding step, the crucibles were removed after two and one half hours and the melt was stirred. The crucibles were then placed back into the furnace for the remaining one and one half hours. Upon completion of the melting phase, the crucibles were removed from the furnace. The molten samples were poured into a 2"×4" graphite mold to form glass slabs. The slabs were immediately transferred to an annealer operating at 1150° F. and held for one to two hours. The slabs were then cooled overnight in the annealer.

The transmittance values for each of the slabs were measured on a Perkin Elmer Lambda 19 Spectrophotometer. The spectral data was collected and then utilized to calculate the optical values for Illuminant A (Ill A), direct solar heat transmittance (DSHT), ultraviolet radiation transmittance (Tuv), and CIE Illuminant C two degree observer color scale coordinates (L*, a*, and b*). The optical values were calculated in accordance with the ASTM E 308-90 test method for computing the colors of objects by using the CIE system and Parry Moon air mass 2.0 solar energy distribution curve.

Comparative examples 1–6 are also included in Table I. Example 1 is a standard heat absorbing green glass composition. Examples 2 and 4 are gray glass compositions. The third standard example covers a blue glass composition. Example 5 is a bronze glass. Example 6 is a clear glass composition.

Table II is a side by side comparison of similar glass compositions, one excluding a metal phosphide and one including a metal phosphide in accordance with the present invention. The table illustrates the improved properties of the present invention over conventional compositions. The glasses produced in accordance with the present invention have a greater differential between the Illuminant A visible light transmittance and the direct solar heat transmittance than the conventional glasses. Thus, the glasses produced with a metal phosphide are able to achieve higher visible light transmittance with a greater absorption of near infrared energy.

The examples illustrate but do not limit the invention. In the examples, all parts and percentages are by weight and:

(a) $Fe_2O_3$, $TiO_2$, $Co_3O_4$, Se, NiO, $CeO_2$, $Fe_2P$, $Zn_3P_2$, CuP, MoP, $Cr_3P_2$, TaP, NbP, $Mn_3P_2$, $Ni_2P$, and SnP are expressed in percent;

(b) total iron is expressed as if all iron present were present as ferric oxide; and (c) The transmittance data in the Table below and throughout are based on a nominal glass thickness of 4 mm.

TABLE II

COMPARATIVE RESULTS

| Example | color | at 4 mm | | | | | |
|---|---|---|---|---|---|---|---|
| | | Ill.A | DSHT | TUV(5t) | Ill.A-DSHT | a* | b* |
| 1 | green | 71.5 | 45 | 35 | 26.5 | −8.8 | 3 |
| 10 | green | 70.7 | 42.9 | 36.8 | 27.8 | −9.3 | 2.9 |
| 4 | gray | 73 | 53 | 50 | 20 | −5 | 1 |
| 11 | gray | 75 | 49.9 | 60.7 | 25 | −5.3 | 0.6 |
| 3 | blue | 64.1 | 58.6 | 52.4 | 5.5 | −2.9 | −7.5 |
| 13 | blue | 58.1 | 45.7 | 57.3 | 12.4 | −4.4 | −11.8 |

In accordance with the provisions of the patent statutes, the present invention has been described in what is considered to represent its preferred embodiment. However, it should be noted that the invention can be practiced otherwise than as described without departing from its spirit and scope.

We claim:

1. A finished silicate glass comprising over 25 mole% of silica and an amount of phosphorus resulting from the admixing, heating, and melting of an amount of at least one metal phosphide in a batch glass composition.

2. A finished silicate glass as recited in claim 1, wherein said batch glass composition contains about 0.05 weight percent or more of a metal phosphide.

3. A finished silicate glass as recited in claim 1, wherein said metal phosphide is selected from the group consisting of iron phosphide, zinc phosphide, titanium phosphide, manganese phosphide, tin phosphide, copper phosphide, nickel phosphide, chromium phosphide, tantalum phosphide, niobium phosphide, lithium phosphide, sodium phosphide, magnesium phosphide, cadmium phosphide, molybdenum phosphide, tungsten phosphide, vanadium phosphide, zirconium phosphide, cobalt phosphide, hafnium phosphide, barium phosphide, boron phosphide, aluminum phosphide, gallium phosphide, indium phosphide, iridium phosphide, scandium phosphide, yttrium phosphide, lanthanum phosphide, cerium phosphide, praseodymium phosphide, terbium phosphide, erbium phosphide, dysprosium phosphide, holmium phosphide, neodymium phosphide, samarium phosphide, germanium phosphide, calcium phosphide, rhodium phosphide, silver phosphide, platinum phosphide, and gadolinium phosphide.

4. A finished silicate glass as recited in claim 1, wherein said metal phosphide is selected from the group consisting of iron phosphide, zinc phosphide, titanium phosphide, and molybdenum phosphide.

5. A finished silicate glass as recited in claim 1, wherein said finished silicate glass includes from about 0.1 to 4.5 weight percent total iron, measures as $Fe_2O_3$.

6. A finished soda-lime-silica glass comprising an amount of phosphorus, said phosphorus resulting from the admixing, melting, and heating of at least one metal phosphide in a batch glass composition.

7. A finished soda-lime-silica glass as defined in claim 6, wherein said finished glass includes from about 0.1 to 4.5 weight percent total iron, measured as $Fe_2O_3$.

8. A finished soda-lime-silica glass as recited in claim 6, wherein said metal phosphide is included in the batch composition at about 0.05 weight percent or more.

9. A finished soda-lime-silica glass as recited in claim 6, wherein said glass at a thickness in the range of 3 mm to 6 mm has an Illuminant A visible light transmittance of at least 70% and direct solar energy transmittance of less than 43%.

10. A finished soda-lime-silica glass as recited in claim 9, wherein said total solar energy transmittance is less than 41%.

11. A finished soda-lime-silica glass as recited in claim 6, wherein said metal phosphide is selected from the group consisting of iron phosphide, zinc phosphide, titanium phosphide, and molybdenum phosphide.

12. A finished soda-lime-silica glass as recited in claim 11, wherein said finished glass includes from about 0.1 to 4.5 weight percent total iron, measured as $Fe_2O_3$.

13. A finished soda-lime-silica glass as recited in claim 12, used as a component of an automotive glazing.

14. A laminated glazing unit, comprising two sheets of a soda-lime-silica glass integrally adhered together through an interposed layer of transparent resinous material, said glass including over 25 mole% of silica and an amount of a phosphorus, said phosphorus resulting from the admixing, melting, and heating of at least one metal phosphide in a batch glass composition.

15. A laminated glazing unit as recited in claim 14, wherein said soda-lime-silica glass includes about 0.1 to 4.5 weight percent total iron, measured as $Fe_2O_3$.

16. A laminated glazing unit as recited in claim 14, wherein said glazing unit has an Illuminant A visible light transmittance of greater than 70% and total solar energy transmittance of less than 43%.

17. A laminated glazing unit as recited in claim 14, wherein said glazing unit has an Illuminant A visible light transmittance of greater than 75% and total solar energy transmittance of less than 47%.

18. A laminated glazing unit as recited in claim 14, wherein each of said glass sheets has a thickness in the range of from about 1.7 mm to about 2.5 mm.

19. A laminated glazing unit as recited in claim 14, wherein said metal phosphide is selected from the group consisting of iron phosphide, zinc phosphide, titanium phosphide, manganese phosphide, tin phosphide, copper phosphide, nickel phosphide, chromium phosphide, tantalum phosphide, niobium phosphide, lithium phosphide, sodium phosphide, magnesium phosphide, cadmium phosphide, molybdenum phosphide, tungsten phosphide, vanadium phosphide, zirconium phosphide, cobalt phosphide, hafnium phosphide, barium phosphide, boron phosphide, aluminum phosphide, gallium phosphide, indium phosphide, iridium phosphide, scandium phosphide, yttrium phosphide, lanthanum phosphide, cerium phosphide, praseodymium phosphide, terbium phosphide, erbium phosphide, dysprosium phosphide, holmium phosphide, neodymium phosphide, samarium phosphide, germanium phosphide, calcium phosphide, rhodium phosphide, silver phosphide, platinum phosphide, and gadolinium phosphide.

20. A laminated glazing unit as recited in claim 14, wherein said metal phosphide is selected from the group consisting of iron phosphide, zinc phosphide, titanium phosphide, and molybdenum phosphide.

* * * * *